US007650375B2

(12) United States Patent
Youn et al.

(10) Patent No.: US 7,650,375 B2
(45) Date of Patent: Jan. 19, 2010

(54) QUANTITATIVE EVALUATION SYSTEM FOR MULTIAGENT GROUPING AND METHOD THEREOF

(75) Inventors: Heeyong Youn, Gyeonggi-do (KR); Hyun Ko, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 366 days.

(21) Appl. No.: 11/709,997

(22) Filed: Feb. 23, 2007

(65) Prior Publication Data

US 2008/0162566 A1    Jul. 3, 2008

(30) Foreign Application Priority Data

Dec. 29, 2006   (KR) .................. 10-2006-0138093

(51) Int. Cl.
*G06F 17/00* (2006.01)
(52) U.S. Cl. ..................................... 709/202
(58) Field of Classification Search ................. 709/202
See application file for complete search history.

(56) References Cited

U.S. PATENT DOCUMENTS 5,617,135 A * 4/1997 Noda et al. .............. 348/14.12
7,373,325 B1 * 5/2008 Hadingham et al. ........... 705/37
2001/0023439 A1 * 9/2001 Miyazaki .................. 709/225
2008/0195463 A1 * 8/2008 Aggour et al. ................ 705/11

FOREIGN PATENT DOCUMENTS

KR    10-2000-0049800 A    8/2000

OTHER PUBLICATIONS

Christopher H. Brooks, et al. "An Introduction to Congregating in Multiagent Systems"; IEEE; 2000; pp. 1-8.
Keitaro Naruse, et al.; "*Group Formation of Agents with Two-dimensional Inner State and One-to-one Subjective Evaluation*"; Proceedings 2003 IEEE International Symposium on Computational Intellgence in Robotics and Automation; Jul. 16-20, 2003; Kobe, Japan.

* cited by examiner

*Primary Examiner*—Wing F Chan
*Assistant Examiner*—Tesfay Yohannes
(74) *Attorney, Agent, or Firm*—Edwards Angell Palmer & Dodge LLP

(57) ABSTRACT

Disclosed is a quantitative evaluation system and method for multiagent grouping, which enables agents to be grouped in such a manner as to ensure efficient agent cooperation. The system comprises: a plurality of agents in a network-connected multiagent system, each of which agents has quantitative information on a predicate that is a type of information to be produced or consumed, and produces or consumes one or more types of information; an adjusting means for receiving the quantitative information from each of the agents, performing quantitative evaluation thereof, and then grouping the plurality of agents into one or more communities; and a message broker means for transferring the information gathered from the plurality of agents to the adjusting means.

16 Claims, 5 Drawing Sheets

Figure 3a $$RQ_{global} = \begin{pmatrix} 0.9 & 0.9 & 0.4 & 0.1 & 0.2 & 0.2 & 0.1 \\ 0.9 & 0.4 & 0.9 & 0.1 & 0.2 & 0.2 & 0.1 \\ 0.8 & 0.4 & 0.4 & 0.4 & 0.2 & 0.2 & 0.6 \\ 0.9 & 0.9 & 0.9 & 0.3 & 0.1 & 0.1 & 0 \\ 0.4 & 0.2 & 0.2 & 0.8 & 0.4 & 0.4 & 0.6 \\ 0.1 & 0.2 & 0.2 & 0.9 & 0.9 & 0.4 & 0.1 \\ 0.1 & 0.1 & 0.2 & 0.9 & 0.4 & 0.9 & 0.1 \\ 0.1 & 0.1 & 0.1 & 0.9 & 0.9 & 0.9 & 0 \\ 0.6 & 0.2 & 0.2 & 0.6 & 0.2 & 0.2 & 0.9 \end{pmatrix} \quad TR_{global} = \begin{pmatrix} -9 & +9 & -6 & -1 & -1 & -1 & -1 \\ -9 & -6 & +9 & -1 & -1 & -1 & -1 \\ +4 & -6 & -6 & -6 & -1 & -1 & -9 \\ +9 & -9 & -9 & -1 & -1 & -1 & -1 \\ -6 & -1 & -1 & +7 & -6 & -6 & -9 \\ -1 & -1 & -1 & -9 & +9 & -6 & -1 \\ -1 & -1 & -1 & -9 & -6 & +9 & -1 \\ -1 & -1 & -1 & +9 & -9 & -9 & -1 \\ -4 & -1 & -1 & -4 & -1 & -1 & +9 \end{pmatrix}$$

Figure 3b $$RQ_{global} \cdot TR_{global} = \begin{pmatrix} -8.1 & +8.1 & -2.4 & -0.1 & -0.2 & -0.2 & -0.1 \\ -8.1 & -2.4 & +8.1 & -0.1 & -0.2 & -0.2 & -0.1 \\ +3.2 & -2.4 & -2.4 & -2.4 & -0.2 & -0.2 & -5.4 \\ +8.1 & -8.1 & -8.1 & -0.3 & -0.1 & -0.1 & 0 \\ -2.4 & -0.2 & -0.2 & +5.6 & -2.4 & -2.4 & -5.4 \\ -0.1 & -0.2 & -0.2 & -8.1 & +8.1 & -2.4 & -0.1 \\ -0.1 & -0.1 & -0.2 & -8.1 & -2.4 & +8.1 & -0.1 \\ -0.1 & -0.1 & -0.1 & +8.1 & -8.1 & -8.1 & 0 \\ -2.4 & -0.2 & -0.2 & -2.4 & -0.2 & -0.2 & +8.1 \end{pmatrix}$$

Figure 5a $$UoP^1 = \begin{pmatrix} +8.1 & +10.5 & -3.3 \\ +8.1 & -3.3 & +10.5 \\ +4.8 & +1.6 & +1.6 \\ +16.2 & +8.1 & +8.1 \\ -2.4 & -0.2 & -0.2 \\ -0.1 & -0.2 & -0.2 \\ -0.1 & -0.1 & -0.2 \\ -0.1 & -0.1 & -0.1 \\ -2.4 & -0.2 & -0.2 \end{pmatrix} \quad UoP^2 = \begin{pmatrix} -0.1 & -0.2 & -0.2 \\ -0.1 & -0.2 & -0.2 \\ -2.4 & -0.2 & -0.2 \\ -0.3 & -0.1 & -0.1 \\ +4.8 & -0.8 & -0.8 \\ +8.1 & +10.5 & -3.3 \\ +8.1 & -3.3 & +10.5 \\ +16.2 & +8.1 & +8.1 \\ -2.4 & -0.2 & -0.2 \end{pmatrix} \quad UoP^3 = \begin{pmatrix} -0.1 \\ -0.1 \\ -5.4 \\ 0 \\ -5.4 \\ -0.1 \\ -0.1 \\ 0 \\ -8.1 \end{pmatrix}$$

Figure 5b $$UoA^1 = \begin{pmatrix} 99.233 \\ 86.927 \\ 86.529 \end{pmatrix} \quad UoA^2 = \begin{pmatrix} 95.312 \\ 81.050 \\ 81.050 \end{pmatrix} \quad UoA^3 = (0)$$

QUANTITATIVE EVALUATION SYSTEM FOR MULTIAGENT GROUPING AND METHOD THEREOF

CROSS-REFERENCE TO RELATED APPLICATION

The present application claims, under 35 U.S.C. §119(a), the benefit of Korean Patent Application No. 10-2006-0138093, filed Dec. 29, 2006, the entire contents of which are hereby incorporated by reference.

BACKGROUND OF THE INVENTION

1. Field of the Invention

The present invention relates to a quantitative evaluation system for multiagent grouping and a method thereof. More particularly, the present invention relates to a quantitative evaluation system for multiagent grouping and a method thereof, which enables agents to be grouped in such a manner as to ensure efficient agent cooperation by quantitatively evaluating the characteristics of individual agents in a multiagent system.

2. Background Art

As generally known in the art, a software agent taking the place of human intelligent decision is introduced into a ubiquitous computing environment, and particularly how to efficiently group a plurality of agents is an important issue in a multiagent environment where a plurality of agents work together. That is, in a multiagent system, it is very important to organize an agent community appropriately, according to the object of the community to be grouped and agent characteristics. Therefore, in order to efficiently handle a specific task, it is essential to perceive agent characteristics and discover an agent optimally matched to the handling of the task. In a multiagent system where a plurality of agents work together, it is important to appropriately model the attributes of agents and group the agents based on the modeling so as to efficiently organize and manage the multiagent system. With regard to this, each agent serves as a producer or consumer of information.

Reference will now be made to agents with reference to FIG. 1, which illustrates conventional agents by way of example.

An agent refers to the subject producing or consuming at least one type of-information. The characteristic of an agent is defined based on information produced or consumed by the agent. The individuality of an agent is represented by the following criteria:

the type of information handled by an agent whether an agent produces or consumes handling information the amount of information handled by an agent As illustrated in FIG. 1, a temperature sensor agent cyclically produces information on sensed temperature as time goes by, and consumes sampling feedback information indicating at which time intervals the temperature sensor agent gathers temperature information. Further, a weather agent consumes a temperature information stream, a wind direction information stream and a humidity information stream produced by the temperature sensor agent, a wind direction sensor agent and a humidity sensor agent, respectively, and produces a weather information stream by processing them. The so-produced weather information is consumed by schedule agents and consumers in other communities. It can be intuitively understood that the temperature sensor agent is closely connected with the weather agent and thus they efficiently operate when grouped into one community.

An example of such multiagent technologies is disclosed in Korean Patent Application Laid-open No. 2000-0049800, published on Aug. 8, 2000 and entitled "System and Method for Optimal Brokerage and Automated Negotiation Based on Multiagent in Electronic Commerce".

The technology disclosed in Korean Patent Application Laid-open No. 2000-0049800 relates to a multiagent-based system and a multiagent-based method for optimal brokerage and automated negotiation in electronic commerce, which creates virtual agents representing sellers, purchasers and brokers, respectively, intermediates between commerce parties coinciding in mutual demands via the created agents, and ultimately allows the agents acting on behalf of the commerce parties to make a contract in an ideal form through a negotiation process. This multiagent-based system includes a web server unit which a plurality of purchasers and a plurality of sellers access, an agent creating program for creating virtual agents representing purchasers and sellers who access the web server unit, a plurality of purchasing agents which are created by the agent creating program and represent the plurality of purchasers, respectively, a plurality of selling agents which are created by the agent creating program and represent the plurality of sellers, respectively, a brokerage agent for controlling the plurality of purchasing agents and the plurality of selling agents to be matched one-to-one to the most ideal counterparty by examining demands from the respective purchasing and selling agents, and a server control means for controlling the agent creating program to create agents of purchasers and sellers who access the web server unit and controlling the brokerage agent to allow each of the purchasing and selling agents to select the most ideal counterparty and negotiate with the selected counterparty. That is, the above-mentioned technology disclosed in Korean Patent Application No. 2000-0049800 improves the success rate of a contract by analyzing inclinations of purchasers and sellers based on artificial intelligence (AI) and connecting each of the purchasers and the sellers with the most appropriate counterparty, and provides the same effect as meeting between real persons by employing a scheme in which a purchasing agent and a selling agent perform negotiation while considering various situations based on learned information.

Another example of multiagent-related technologies is disclosed by C. H. Brooks, E. H. Durfee and A. Armstrong in "An Introduction to Congregation in Multiagent Systems", Proceeedings of the Fourth International Conference on Multiagent Systems. 2000, pp. 79-86. The technology disclosed in this publication proposes a congregation model, which consists of plural agents having similar objects, in order to improve efficiency in a multiagent environment.

Yet another multiagent-related technology is disclosed by K. Naruse, M. Kinoshita and Y. Kakazu in "Group Formation of Agents with Two-dimensional Inner State and One-to-one Subjective Evaluation", Proc. of IEEE Int. Symposium on Computational Intelligence in Robotics and Automation, Kobe, Japan, 2003, pp. 1492-1497. The technology disclosed in this publication proposes to form groups between agents based on individual satisfactions, and particularly to provide grouping based on the determination whether or not the grouping achieves satisfactions according to the roles of agents.

However, in conventional multiagent-related technologies including the technology disclosed in Korean Patent Application No. 2000-0049800, there is a problem in that the yield is reduced due to inundation with unnecessary information and the starvation of information desired by agents.

Further, in conventional multiagent grouping technologies, there is a problem in that an evaluation is made of agent characteristics based on only qualitative criteria.

Further, in the technology disclosed in the publication by C. H. Brooks, E. H. Durfee and A. Armstrong, the role of agents is established on the assumption of only one of the roles of a seller and a buyer, and thus there is a problem in that this technology is somewhat irrelevant to distributed ubiquitous computing in which the roles demanded of agents dynamically change.

Further, the technology disclosed in the publication by K. Naruse, M. Kinoshita and Y. Kakazu is insufficient for conducting efficient grouping because it is based on only individual satisfactions.

SUMMARY OF THE INVENTION

Accordingly, the present invention has been made to solve the above-mentioned problems occurring in the prior art, and an object of the present invention is to provide a quantitative evaluation system for multiagent grouping and a method thereof, which supports agent grouping in such a manner as to ensure efficient agent cooperation by presenting quantitative evaluation of the characteristics of individual agents in a multiagent system. That is, an agent is considered the subject consuming, processing and producing information, and the characteristic of a corresponding agent is quantitatively expressed according to statistical aspects of information consumed and produced by individual agents, so that there is provided reasonable grouping in which agents capable of displaying synergy are gathered in groups.

A further object of the present invention is to provide a quantitative evaluation system for multiagent grouping and a method thereof, which performs quantitative evaluation of information inundation and information starvation so as to balance the production-consumption of information within a community, and proposes community organization enabling all communities to minimize information inundation and information starvation.

A further object of the present invention is to provide a quantitative evaluation system for multiagent grouping and a method thereof, which provides a guideline for appropriately forming communities according to matchability of interactions between agents, based on quantitative evaluation.

A further object of the present invention is to provide a quantitative evaluation system for multiagent grouping and a method thereof, which considers individual satisfactions of agents as well as satisfactions of formed communities and further considers the overall satisfaction of the system in agent grouping.

In order to accomplish these objects, in one aspect, the present invention provides a quantitative evaluation system for multiagent grouping, comprising: (a) a plurality of agents in a network-connected multiagent system, each of which agents has quantitative information on a predicate that is a type of information to be produced or consumed, and produces or consumes one or more types of information; (b) an adjusting means for receiving the quantitative information from each of the agents, performing quantitative evaluation thereof, and then grouping the plurality of agents into one or more communities; and (c) a message broker means for transferring the information gathered from the plurality of agents to the adjusting means.

In a preferred embodiment, the quantitative information includes an RQ (Request Quality) value corresponding to quality of information on the predicate and a TR (Time Resolution) value corresponding to quantity of information created for the predicate.

Preferably, the adjusting means performs quantitative evaluation of the quantitative information by using any one of UoP (Utility of Predicate), UoA (Utility of Agent) and UoC (Utility of Community).

Also preferably, the communities grouped by the adjusting means are organized by executing calculation of the following equation:

$$CO_{global} = \left\{ w \mid \max\left(\sum_{k=w} UoC_w \cdot Cwg_w\right) \right\}$$

where $CO_{global}$ denotes a universal set of all the communities within the system, w denotes a string representing an agent set sequence in which a multiplication of UoC and Cwg is maximized, k denotes a constant, $UoC_w$ denotes the UoC of community w, and $Cwg_w$ denotes the weight which community w has.

Suitably, the Cwg is calculated by executing the following equation:

$$Cwg^c = \frac{\sum_{j=Mco_c} \sum_{k=all\ predicate} rq_k^j \cdot |tr_k^j|}{\sum_{j=Mco_{global}} \sum_{k=all\ predicate} rq_k^j |tr_k^j|}$$

where j denotes a variable, $Mco_c$ denotes a set of agents belonging to community c, $rq_k^j$ denotes an RQ value for the predicate of agent j, and $tr_k^j$ denotes a TR value for the predicate of agent j.

Also suitably, the UoCw is calculated by executing the following equation:

$$UoC_c = \sum_{k=Mco_w} UoA_k^c \cdot Awg_k^c$$

where c denotes a variable representing an ordinal number of community c, $UoA_k^c$ denotes the UoA of agent k belonging to community c, and $Awg_k^c$ denotes an influence which agent k exercises in community c.

Preferably, the $Awg_k^c$ is calculated by executing the following equation:

$$Awg_a^c = \frac{\sum_{k=all\ predicate} rq_k^a \cdot |tr_k^a|}{\sum_{j=Mco_c} \sum_{k=all\ predicate} rq_k^j \cdot |tr_k^j|}$$

where a denotes a variable, $rq_k^a$ denotes an RQ value for the predicate of agent a, and $tr_k^a$ denotes a TR value for the predicate of agent a.

The $UoA_k^c$ is, preferably, calculated by executing the following equation:

$$UoA_k^c = \frac{\left(\dfrac{\sum_{k=all\ predicate} UoP_k^{a,c}}{\sum_{k=all\ predicate} rq_k^a \cdot |tr_k^a|} \times 100 + 100\right)}{2}$$

where $UoP_k^{a,c}$ denotes the UoP which agent a belonging to community c satisfies for predicate k.

Suitably, the $UoP_k^{a,c}$ is calculated by executing the following equation:

$$UoP_p^{a,c} = \begin{cases} \left|\sum_{k=Mtrld_p^{c-}} rq_p^k \cdot tr_p^k\right| & \left(\text{if } tr_p^a > 0, \left|\sum_{k=Mtrld_p^{c-}} rq_p^k \cdot tr_p^k\right| \geq rq_p^a \cdot tr_p^a\right) \\ \left|\sum_{k=Mtrld_p^{c-}} rq_p^k \cdot tr_p^k\right| - \left(rq_p^a \cdot tr_p^a - \sum_{k=Mtrld_p^{c-}} rq_p^a \cdot tr_p^a\right) & \left(\text{if } tr_p^a > 0, \left|\sum_{k=Mtrld_p^{c-}} rq_p^k \cdot tr_p^k\right| \geq rq_p^a \cdot tr_p^a\right) \\ |rq_p^a \cdot tr_p^a| - \left(\sum_{k=Mtrld_p^{c+}} rq_p^k \cdot tr_p^k - |rq_p^a \cdot tr_p^a|\right) & \left(\text{if } tr_p^a < 0, \sum_{k=Mtrld_p^{c+}} rq_p^k \cdot tr_p^k \geq |rq_p^a \cdot tr_p^a|\right) \\ \sum_{k=Mtrld_p^{c+}} rq_p^k \cdot tr_p^k - \left(|rq_p^a \cdot tr_p^a| - \sum_{k=Mtrld_p^{c+}} rq_p^a \cdot tr_p^a\right) & \left(\text{if } tr_p^a < 0, \sum_{k=Mtrld_p^{c+}} rq_p^k \cdot tr_p^k < |rq_p^a \cdot tr_p^a|\right) \\ 0 & (\text{if } rq_p^a \cdot tr_p^a = 0) \end{cases}$$

where $Mtrld_p^{c+}$ denotes a set of agents belonging to community c, which have TR values with sign (+) for predicate p, and $Mtrld_p^{c-}$ denotes a set of agents belonging to community c, which have TR values with sign (−) for predicate p. The sign (+) means production. The sign (−) means consumption.

In another aspect, the present invention provides a quantitative evaluation method for grouping a plurality of agents in a network-connected multiagent system, the method comprising the steps of: (a) gathering, by each of the agents, quantitative information on a predicate that is a type of information to be produced or consumed; (b) transmitting, by each of the agents, the gathered quantitative information to a message broker means; (c) transferring, by the message broker means, the quantitative information to an adjusting means; (d) receiving, by the adjusting means, the quantitative information; (e) performing, by the adjusting means, quantitative evaluation of the quantitative information; (f) estimating, by the adjusting means, a community organization for the plurality of agents according to a result of the quantitative evaluation by the adjusting means; (g) determining, by the adjusting means, if a current community organization is appropriate; (h) and performing, by the adjusting means, maintenance or update for the current community organization based on a result of the determination.

In a preferred embodiment, the quantitative information includes an RQ value corresponding to quality of information on the predicate and a TR value corresponding to quantity of information created for the predicate.

Preferably, in the step of performing quantitative evaluation, any one of UoP (Utility of Predicate), UoA (Utility of Agent) and UoC (Utility of Community) is used.

Also preferably, in the step of estimating a community organization, the community organization is estimated by executing calculation of the following equation:

$$CO_{global} = \left\{ w | \max\left( \sum_{k=w} UoC_w \cdot Cwg_w \right) \right\}$$

where, $CO_{global}$ denotes a universal set of all the communities within the system, w denotes a string representing an agent set sequence in which a multiplication of UoC and Cwg is maximized, k denotes a constant, $UoC_w$ denotes the UoC of community w, and $Cwg_w$ denotes the weight which community w has.

Suitably, the Cwg is calculated by executing the following equation:

$$Cwg^c = \frac{\sum_{j=Mco_c} \sum_{k=all\ predicate} rq_k^j \cdot |tr_k^j|}{\sum_{j=Mco_{global}} \sum_{k=all\ predicate} rq_k^j |tr_k^j|}$$

where j denotes a variable, $Mco_c$ denotes a set of agents belonging to community c, $rq_k^j$ denotes an RQ value for the predicate of agent j, and $tr_k^j$ denotes a TR value for the predicate of agent j.

Also suitably, the UoCw is calculated by executing the following equation:

$$UoC_c = \sum_{k=Mco_w} UoA_k^c \cdot Awg_k^c$$

where c denotes a variable representing an ordinal number of community c, $UoA_k^c$ denotes the UoA of agent k belonging to community c, and $Awg_k^c$ denotes an influence which agent k exercises in community c.

Also suitably, the $Awg_k^c$ is calculated by executing the following equation:

$$Awg_a^c = \frac{\sum_{k=all\ predicate} rq_k^a \cdot |tr_k^a|}{\sum_{j=Mco_c} \sum_{k=all\ predicate} rq_k^j \cdot |tr_k^j|}$$

where a denotes a variable, $rq_k^a$ denotes an RQ value for the predicate of agent a, and $tr_k^a$ denotes a TR value for the predicate of agent a.

Preferably, the $UoA_k^c$ is calculated by executing the following equation:

$$UoA_k^c = \frac{\left( \frac{\sum_{k=all\ predicate} UoP_k^{a,c}}{\sum_{k=all\ predicate} rq_k^a \cdot |tr_k^a|} \times 100 + 100 \right)}{2}$$

where $UoP^{a,c}_k$ denotes the UoP that agent a belonging to community c satisfies for predicate k.

Suitably, the $UoP^{a,c}_k$ is calculated by executing the following equation:

$$UoP_p^{a,c} = \begin{cases} \left|\sum_{k=MtrId_p^{c-}} rq_p^k \cdot tr_p^k\right| & \left(\text{if } tr_p^a > 0, \left|\sum_{k=MtrId_p^{c-}} rq_p^k \cdot tr_p^k\right| \geq rq_p^a \cdot tr_p^a\right) \\ \left|\sum_{k=MtrId_p^{c-}} rq_p^k \cdot tr_p^k\right| - \left(rq_p^a \cdot tr_p^a - \sum_{k=MtrId_p^{c-}} rq_p^a \cdot tr_p^a\right) & \left(\text{if } tr_p^a > 0, \left|\sum_{k=MtrId_p^{c-}} rq_p^k \cdot tr_p^k\right| \geq rq_p^a \cdot tr_p^a\right) \\ |rq_p^a \cdot tr_p^a| - \left(\sum_{k=MtrId_p^{c+}} rq_p^k \cdot tr_p^k - |rq_p^a \cdot tr_p^a|\right) & \left(\text{if } tr_p^a < 0, \sum_{k=MtrId_p^{c+}} rq_p^k \cdot tr_p^k \geq |rq_p^a \cdot tr_p^a|\right) \\ \sum_{k=MtrId_p^{c+}} rq_p^k \cdot tr_p^k - \left(|rq_p^a \cdot tr_p^a| - \sum_{k=MtrId_p^{c+}} rq_p^k \cdot tr_p^k\right) & \left(\text{if } tr_p^a < 0, \sum_{k=MtrId_p^{c+}} rq_p^k \cdot tr_p^k < |rq_p^a \cdot tr_p^a|\right) \\ 0 & (\text{if } rq_p^a \cdot tr_p^a = 0) \end{cases}$$

where $MtrId_p^{c+}$ denotes a set of agents belonging to community c, which have TR values with sign (+) for predicate p, and $MtrId_p^{c-}$ denotes a set of agents belonging to community c, which have TR values with sign (−) for predicate p. The sign (+) means production. The sign (−) means consumption.

BRIEF DESCRIPTION OF THE DRAWINGS

The above and other objects, features and advantages of the present invention will be more apparent from the following detailed description taken in conjunction with the accompanying drawings, in which:

FIG. 3 is a view illustrating matrices of RQ and TR values in accordance with a preferred embodiment of the present invention;

FIG. 5 is a view illustrating matrices of UoP and UoA in accordance with a preferred embodiment of the present invention.

DETAILED DESCRIPTION OF THE PREFERRED EMBODIMENTS

Figure 1:
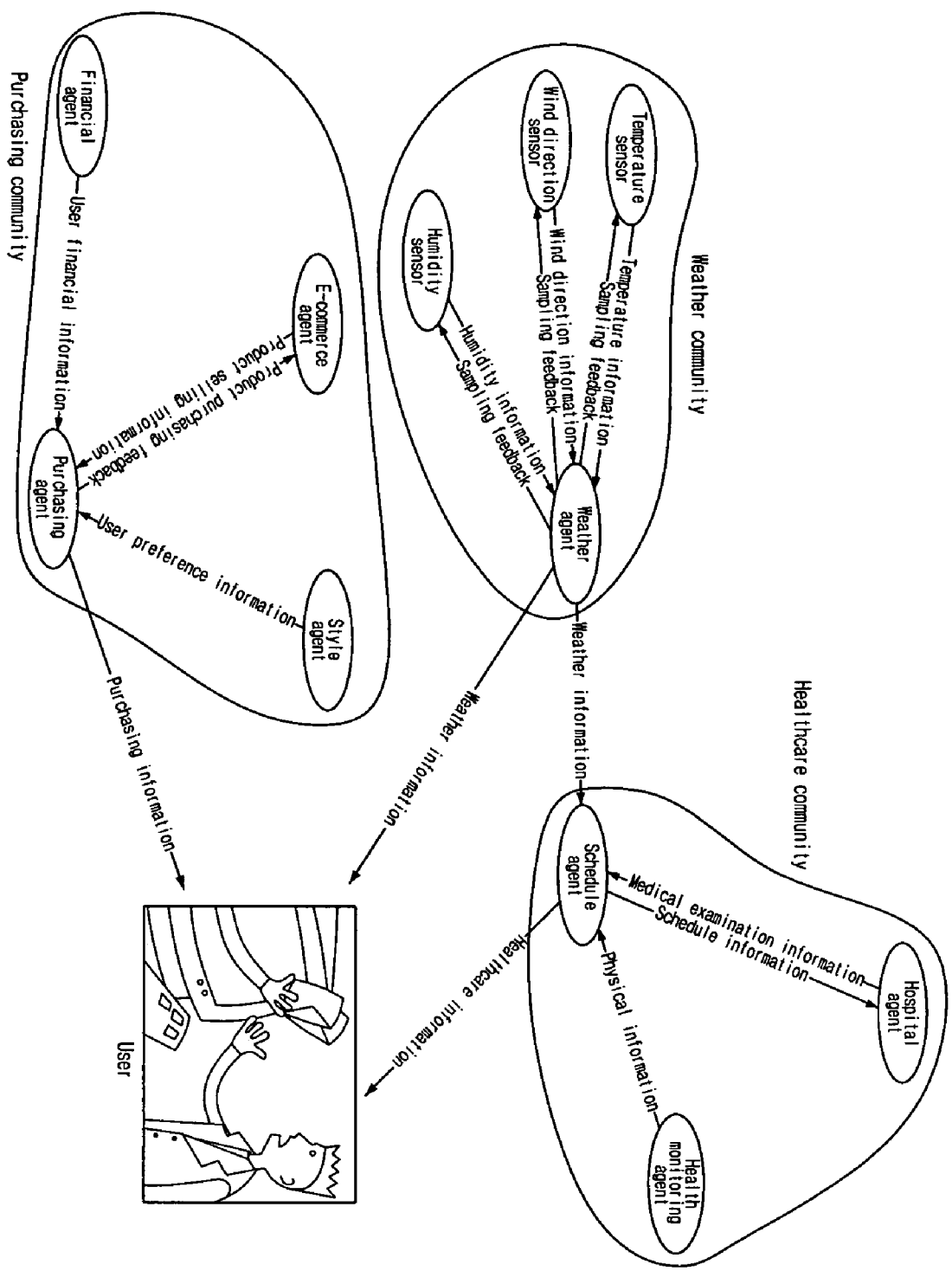
FIG. 1 is a view illustrating conventional agents by way of example.

Hereinafter, preferred embodiments of the present invention will be described with reference to the accompanying drawings. In the following description and drawings, the same reference numerals are used to designate the same or similar components, and so repetition of the description on the same or similar components will be omitted.

In the present invention, a software agent is assumed to be the subject consuming, processing and producing information streams. Each agent consumes and produces specific information streams.

Reference will now be made to a quantitative evaluation system for multiagent grouping according to the present invention, with reference to FIGS. 2 and 3.

Figure 2:
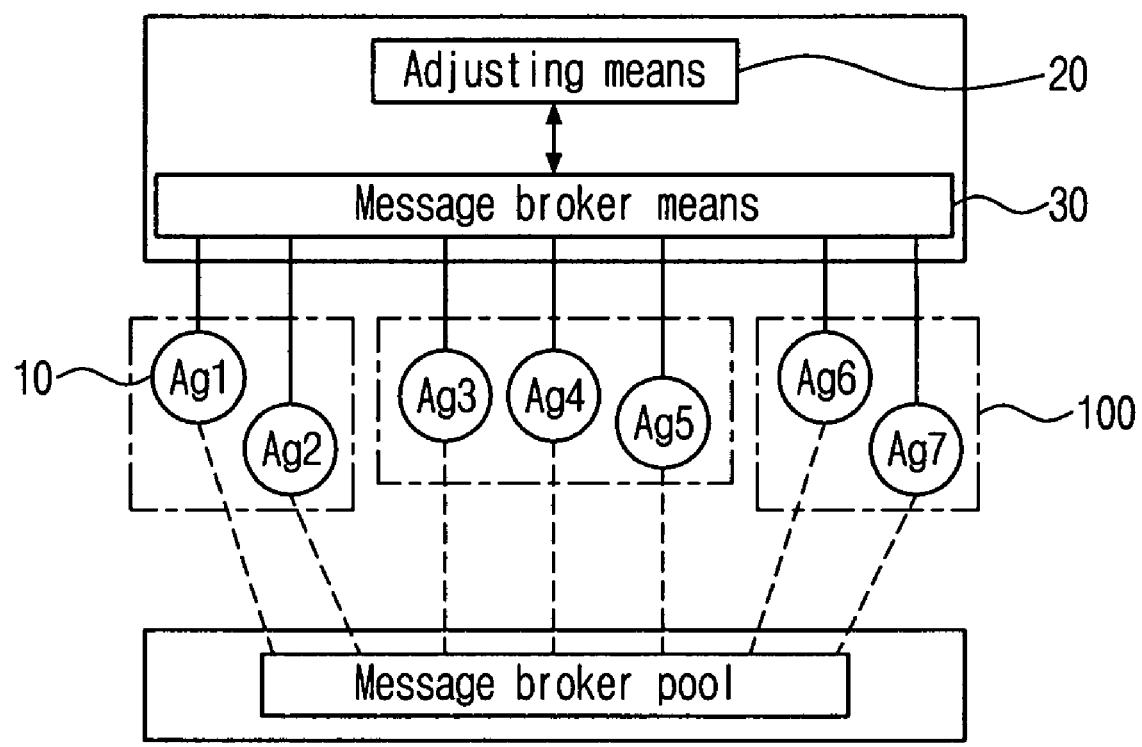
FIG. 2 is a block diagram illustrating a quantitative evaluation system for multiagent grouping in accordance with a preferred embodiment of the present invention.

FIG. 2 is a block diagram illustrating a quantitative evaluation system for multiagent grouping according to a preferred embodiment of the present invention.

As illustrated in FIG. 2, the quantitative evaluation system according to a preferred embodiment of the present invention is based on the conventional multiagent system, and includes a plurality of agents 10, each corresponding to the subject producing or consuming one or more types of information and having quantitative information on a predicate which is the type of information to be produced or consumed, adjusting means 20 for receiving the quantitative information related to each agent 10, performing quantitative evaluation thereof, and then grouping the plurality of agents 10 into communities 100; and message broker 30 means corresponding to an intermediary for transferring information gathered from the plurality of agents 10 to the adjusting means 20. The plurality of agents 10 and the adjusting means 20 may be operative in one server or may be operative in separated servers. Technology related to the multiagent system is well known in the art, so a detailed description thereof will be omitted.

The agents 10 need to be grouped into the communities 100 according to similar objects and mutual necessities. A set of communities 100 can be defined by the following equation:

$$CO = \{co_1, co_2, co_3, \ldots, co_n\}$$

$$\forall i \forall j co_i \in CO\ co_j \in CO,\ co_i \cap co_j = \phi \quad (1)$$

In Equation (1), CO denotes a universal set of all communities 100 within the system. Individual communities 100 are bound to individually exist without overlapping each other, and are subsets of the universal set CO.

Next, the agents 10 within the system can be defined by the following equation:

$$AG = \{ag_1, ag_2, ag_3, \ldots, ag_n\}$$

$$\forall ag_i \in AG,\ ag_i \in co_j \quad (2)$$

In Equation (2), AG denotes a universal set of all agents 10 within the system. Further, all the agents 10 must belong to at least one community 100. That is, one agent 10 cannot belong to two or more communities 100.

Hereinafter, a predicate will be described in detail.

The predicate refers to the type of a data stream to be produced or consumed by each agent 10. For example, temperature information, which is a data stream produced by a temperature sensor agent, or a weather forecast information stream produced by a weather agent corresponds to the predicate of the corresponding agent. Further, a temperature item, a wind direction item and a humidity item consumed by the weather agent as well as a weather information item produced by the weather agent themselves also correspond to the predicate. Thus, the predicate may be considered a label which specifies a datagram to be produced or consumed by a specific node (agent).

Individual agents 10 all have quantitative information called RQ (Request Quality) and TR (Time Resolution) values for all the predicates.

Firstly, the RQ will be discussed below.

The RQ means the quality of a corresponding predicate required by an agent 10. That is, the RQ signifies how frequently an agent 10 produces correct information. In other words, the RQ probabilistically represents how accurate the data stream of a predicate to be produced or consumed by an agent 10 is. The RQ follows a binomial distribution, and has a value of 0 to 1.0. This value is a relative numerical value. A value of 1.0 means that a predicate produced by the corresponding agent 10 always yields only a correct information stream, and a value of 0 means that information produced by a corresponding agent 10 always yields only an incorrect information stream. This can be defined by the following equation:

$$RQ_{global} = \{RQ_1, RQ_2, RQ_3, \ldots, RQ_n\}$$

$$RQ_k = \{rq_1^k, rq_2^k, rq_3^k, \ldots, rq_n^k\}$$

$$\forall i, RQ_i \subset ag_i \quad (3)$$

In Equation (3), $RQ_{global}$ denotes a universal set of RQ values which the respective agents 10 have, and $RQ_k$ belonging to an agent $ag_k$ denotes a universal set of RQ information of agent k. Individual agents 10 have RQ values according to all the predicates, and these values are defined as elements of the RQ, that is, rq.

Further, in Equation (3), $rq_i^k$ denotes an RQ value for predicate i of agent k. For example, the rq for "weather information" produced by the weather agent and the rq for "temperature information" consumed by the weather agent can be expressed as follows:

$$rq_{weather\ information}^{weather\ agent},$$
$$rq_{temperature\ information}^{weather\ agent}$$

Of course, the term "weather information" or "temperature information" is actually replaced by a specific number.

Further, the probability that k pieces of information among n pieces of information produced for predicate i by a specific agent is correct can be obtained by the following equation:

$$P(X = k) = \binom{n}{k}(rq_i)^k(1 - rq_i)^{n-k} \quad (4)$$

For example, assuming that the weather agent produces accurate information with a probability of 0.8, that is, when the weather agent has an RQ value of 0.8, the probability that 7 messages among 10 messages produced by the weather agent are valid can be obtained by substituting the corresponding numerical values into Equation (4), as given in the following equation:

$$P(X = 7) = \binom{10}{7}(0.8)^7(1 - 0.8)^{10-7} \quad (4a)$$

As can be seen from Equation (4), the RQ has a Poisson distribution, and corresponds to a qualitative measurement indicating how much information among the whole entry information is valid.

Next, the TR will be discussed below.

The TR means the quantity of information created for a specific predicate to be produced or consumed by an agent 10. That is, the TR is a yardstick for how much information an agent 10 produces for a specific predicate. This signifies the quantity of information produced or consumed within a fixed period of time. The TR has an exponential distribution with a rate of λ, and has sign (+) or (−) according to whether information is produced or consumed. That is, it has sign (+) when predicate information of the corresponding agent 10 is produced, and has sign (−) when consumed. Such an attribute of the TR can be defined by the following equation:

$$TR_{global} = \{TR_1, TR_2, TR_3, \ldots, TR_n\}$$

$$TR_k = \{tr_1^k, tr_2^k, tr_3^k, \ldots, tr_n^k\}$$

$$\forall i, TR_i \subset ag_i \quad (5)$$

In Equation (5), $TR_{global}$ denotes a universal set of TR values which the respective agents 10 have, and $TR_k$ belonging to an agent $ag_k$ denotes a universal set of TR information of agent k. Individual agents 10 have TR values according to all the predicates, and these values are defined as elements of the TR, that is, tr.

Further, in Equation (5), $tr_i^k$ denotes a TR value for predicate i of agent k. For example, the tr for "weather information" produced by the weather agent and the tr for "temperature information" consumed by the weather agent can be expressed as follows:

$$tr_{weather\ information}^{weather\ agent},$$
$$tr_{temperature\ information}^{weather\ agent}$$

Of course, the term "weather information" or "temperature information" is actually replaced by a specific number.

The TR has the same meaning as the RQ to some extent. All the agent 10 have a TR value for each predicate i. Since the TR follows an exponential distribution, the probability that a specific agent 10 having a certain TR value receives information within time w can be predicted by the following equation:

$$P(W \leq w) = 1 - e^{-|tr_i| \cdot w} \quad (6)$$

Equation (6) means the probability that, for an information quantity per time of tr, a message occurs again within a time interval of 0 to w after the latest information is sent. For example, assuming that the weather agent consumes 100 pieces of information per second for the predicate "temperature information", that is, when the weather agent has a TR value of −100 (in messages/sec), the probability that the time interval is equal to or less than 1/1000 second can be obtained by substituting the corresponding numerical values into Equation (6), as given in the following equation:

$$P(W \leq 10^{-3}) = 1 - e^{-|-100| \cdot 10^{-3}} \quad (6a)$$

As can be seen from Equation (6), the TR has an exponential distribution, and corresponds to a measurement regarding at which time intervals entry information enters on average.

In this way, the RQ represents the quality of information for a predicate produced or consumed by a specific agent 10, and the TR represents the quantity of information for the corresponding predicate.

FIG. 3 illustrates matrices of RQ and TR values according to a preferred embodiment of the present invention.

As illustrated in FIG. 3a, the RQ and TR values for every agent 10 are expressed in the form of a matrix, respectively. A yardstick for the quantity of information handled by the agents 10 is expressed by RQ·TR corresponding to a simple multiplication of the RQ and TR values, as depicted in FIG. 3b, and reflects relative information input/output aspects of the agents 10. That is, the characteristics of individual agents 10 are expressed by reflecting both the qualitative RQ value and the quantitative TR value.

FIG. 3 illustrates an RQ matrix, a TR matrix and an RQ-TR multiplication matrix of a system consisting of 7 agents 10 and having 9 predicates. That is, 7 columns of each matrix represent individual agents 10, and 9 rows of each matrix represent predicates for each agent 10. For example, a value of 0.4 located in the $2^{nd}$ column and the $3^{rd}$ row of the RQ matrix denotes the RQ value of predicate no. 2 handled by agent no. 1 (the $1^{st}$ column indicates agent no. 0). Similarly, a value of −0.2 located in the $3^{rd}$ column and the $5^{th}$ row of the RQ·TR matrix denotes an input/output for predicate information stream no. 4 handled by agent no. 2. In the present invention, the characteristics of individual agents 10 are quantified based on the RQ·TR matrix, and are quantitatively evaluated with regard to grouping suitability. This means that both the RQ value, which represents the qualitative aspect of information, and the TR value, which represents the input/ output direction and the quantitative aspect of information, are reflected in the evaluation.

Reference will now be made to a quantitative evaluation method for multiagent grouping, with reference to FIG. 4.

Figure 4:
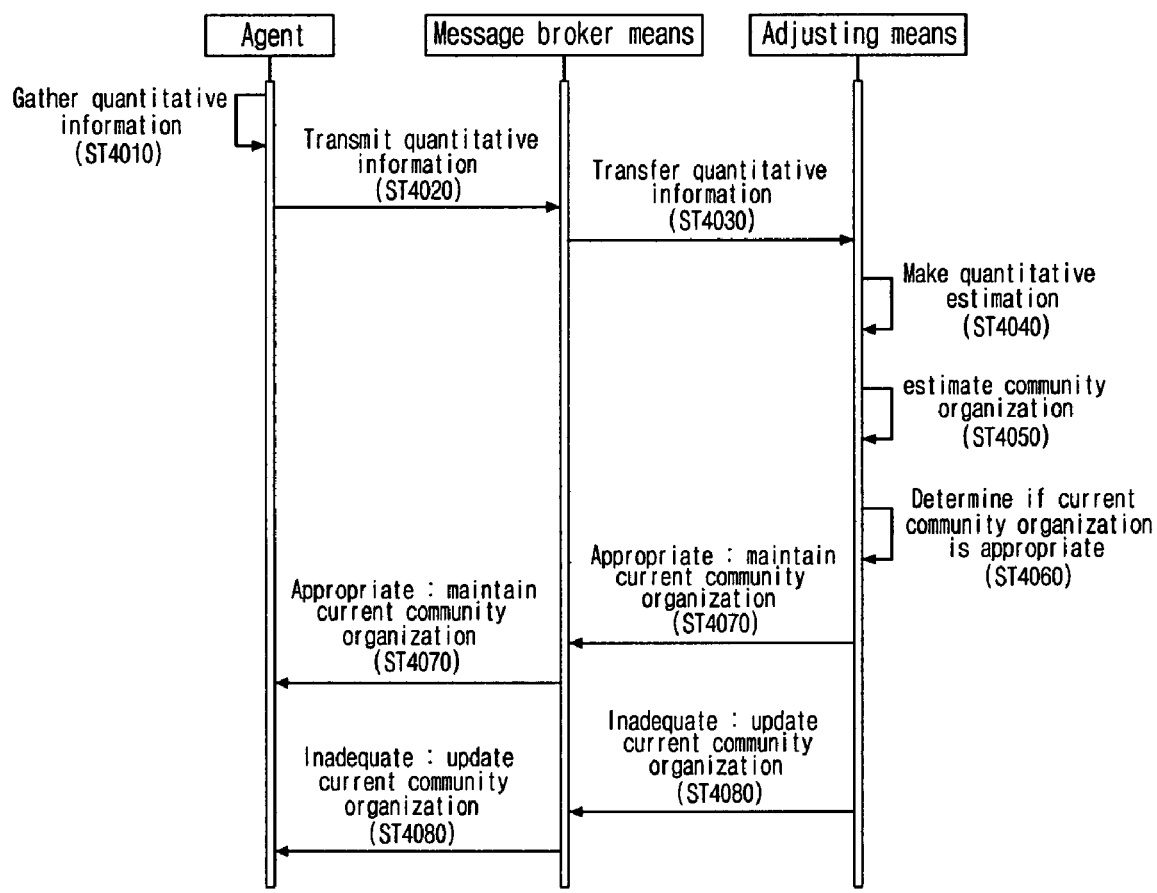
FIG. 4 is a flowchart for explaining a quantitative evaluation method for multiagent grouping in accordance with a preferred embodiment of the present invention.

FIG. 4 is a flowchart for explaining a quantitative evaluation method for multiagent grouping according to a preferred embodiment of the present invention.

As illustrated in FIG. 4, an agent 10 gathers quantitative information on a predicate which is the type of information to be produced or consumed (ST4010). Technologies for gathering information by the agent 10 are well known in the art, so a detailed description thereof will be omitted. The quantitative information includes an RQ value corresponding to the quality of predicate information and a TR value corresponding to the quantity of information created for a predicate. If gathering of the quantitative information is completed, the agent 10 transmits the gathered quantitative information to message broker means 30 (ST4020). The message broker means 30 transfers the quantitative information again to adjusting means 20 (ST4030). Upon receiving the quantitative information, the adjusting means 20 performs quantitative evaluation of the received quantitative information after quantitative information for a plurality of agents 10 is all received (ST4040). Upon completing the quantitative evaluation, the adjusting means 20 estimates community 100 organization for the plurality of agents 10 (ST4050). Based on the estimated community 100 organization, the adjusting means 20 determines if a current community 100 organization is appropriate (ST4060). When a result of the determination in step ST4060 shows that the current community 100 organization is appropriate, the current community 100 organization is maintained (ST 4070). However, when the result of the determination shows that the current community 100 organization is not appropriate, the current community 100 organization is updated with the estimated community organization estimated in step ST 4050 (ST4080).

In the present invention, the quantitative evaluation is made in step ST4040 by using an evaluation function, which can be considered matchability between agents 10, based on quantitatively expressed characteristics of the agent 10. That is, a quantitative evaluation is made of matchability between agents 10 in step ST4040 by using three utility functions, that is, UoP (Utility of Predicate), UoA (Utility of Agent) and UoC (Utility of Community).

Prior to giving a detailed description of the utility functions, it is noted that the principle of expressing numerical formulas in the present invention is given as follows:

$rq_p^a$: an rq value for predicate p of agent a $tr_p^a$: a tr value for predicate p of agent a $MtrId_p^{c+}$: a set of agents belonging to community c having a tr value with sign (+) for predicate p $MtrId_p^{c-}$: a set of agents belonging to community c having a tr value with sign (−) for predicate p $Mco_c$: a set of agents belonging to community c Firstly, the UoP will be described. The UoP means the degree of utility which agent a belonging to community c has for produced or consumed data of predicate p. For example, in the case of a schedule agent belonging to a healthcare community, the UoP may be the utility for "physical information" predicate information which the schedule agent receives from a health monitoring agent, the utility for "healthcare service" predicate information which the schedule agent itself produces, and so forth.

In the case where an agent 10 itself is the information producer of a corresponding predicate, the more other agent consumers within the community consume the corresponding predicate information, the larger the utility value corresponding to the UoP. In the case where an agent 10 is one of information consumers of a corresponding predicate, a utility value corresponding to the UoP is large when the agent 10 can receive the corresponding predicate information without starvation or inundation. In the standpoint of an information consumer of a corresponding predicate, it is important to receive only as much information as desired, and a utility value decreases when the information consumer is inundated with information. The UoP can be obtained by the following equation:

$$UoP_p^{a,c} = \begin{cases} \left| \sum_{k=MtrId_p^{c-}} rq_p^k \cdot tr_p^k \right| & \left( \text{if } tr_p^a > 0, \left| \sum_{k=MtrId_p^{c-}} rq_p^k \cdot tr_p^k \right| \geq rq_p^a \cdot tr_p^a \right) \\ \left| \sum_{k=MtrId_p^{c-}} rq_p^k \cdot tr_p^k \right| - \left( rq_p^a \cdot tr_p^a - \sum_{k=MtrId_p^{c-}} rq_p^a \cdot tr_p^a \right) & \left( \text{if } tr_p^a > 0, \left| \sum_{k=MtrId_p^{c-}} rq_p^k \cdot tr_p^k \right| \geq rq_p^a \cdot tr_p^a \right) \\ |rq_p^a \cdot tr_p^a| - \left( \sum_{k=MtrId_p^{c+}} rq_p^k \cdot tr_p^k - |rq_p^a \cdot tr_p^a| \right) & \left( \text{if } tr_p^a < 0, \sum_{k=MtrId_p^{c+}} rq_p^k \cdot tr_p^k \geq |rq_p^a \cdot tr_p^a| \right) \\ \sum_{k=MtrId_p^{c+}} rq_p^k \cdot tr_p^k - \left( |rq_p^a \cdot tr_p^a| - \sum_{k=MtrId_p^{c+}} rq_p^k \cdot tr_p^k \right) & \left( \text{if } tr_p^a < 0, \sum_{k=MtrId_p^{c+}} rq_p^k \cdot tr_p^k < |rq_p^a \cdot tr_p^a| \right) \\ 0 & (\text{if } rq_p^a \cdot tr_p^a = 0) \end{cases} \quad (7)$$

In Equation (7), a $UoP_p^{a,c}$ value denotes a relative value indicating the degree of satisfaction which agent a belonging to community c has for predicate p, and the fact that this value is large means that a corresponding agent 10 is highly satisfied with an input/output of corresponding information. If agents 10 belonging to community c only produce or consume information streams for predicate p within the community, this community is not desirable. This is because it is desirable to balance the production and the consumption of specific information within a community 100.

For example, when specific agent a has an RQ·TR value of +8.1 (sign (+) means the production of information, as mentioned above) for predicate 0, the UoP has a value of +8.1 if there is an agent 10 which has an RQ·TR value of −8.1 (sign (−) means the consumption of information) among agents 10 in the same community 100, of which can be said that the UoP has a preferred value. This is because the community 100 has a production-consumption balance in predicate 0. The UoP is used for performing quantitative evaluation of utility according to a balance of information streams configured by agents 10. That is, a UoP value increases as the production-consumption of information within a community 100 gets more and more balanced, and decreases as the production-consumption of information within a community 100 gets more and more out of balance.

Five conditions considered in calculating the UoP according to Equation (7) will be described below in detail.

$$\left|\sum_{k=Mtrld_p^{C-}} rq_p^k \cdot tr_p^k\right| \quad \left(\text{if } tr_p^a > 0, \left|\sum_{k=Mtrld_p^{C-}} rq_p^k \cdot tr_p^k\right| \geq rq_p^a \cdot tr_p^a\right) \quad (7a)$$

When $tr_p^a > 0$ is satisfied, that is, a corresponding agent is an information producer for a corresponding predicate, and the sum of rq·tr values of information consumers within a corresponding community is greater than the rq·tr value of the information producer, the UoP is equal to the sum of the quantities of predicate information consumed by agents 10 within the community 100. This is based on the fact that, from the standpoint of the information producer, the more consumers of information is produced by the information producer, the better.

$$\left|\sum_{k=Mtrld_p^{C-}} rq_p^k \cdot tr_p^k\right| - \left(rq_p^a \cdot tr_p^a - \sum_{k=Mtrld_p^{C-}} rq_p^a \cdot tr_p^a\right) \quad (7b)$$

$$\left(\text{if } tr_p^a > 0, \left|\sum_{k=Mtrld_p^{C-}} rq_p^k \cdot tr_p^k\right| \geq rq_p^a \cdot tr_p^a\right)$$

When $tr_p^a > 0$ is satisfied, that is, a corresponding agent is an information producer for a corresponding predicate, and the sum of rq·tr values of information consumers within a corresponding community is less than the rq·tr value of the information producer, that is, the production of the corresponding predicate exceeds the consumption thereof, the UoP also has a value of $$\left|\sum_{k=Mtrld_p^{C-}} rq_p^k \cdot tr_p^k\right|,$$

as in Equation (7a), but the difference between the quantities of information production and information consumption is subtracted from the value of $$\left|\sum_{k=Mtrld_p^{C-}} rq_p^k \cdot tr_p^k\right|.$$

This is because information production within the community 100 becomes greater than information consumption, and thus information inundation occurs.

$$|rq_p^a \cdot tr_p^a| - \left(\sum_{k=Mtrld_p^{C+}} rq_p^k \cdot tr_p^k - |rq_p^a \cdot tr_p^a|\right) \quad (7c)$$

$$\left(\text{if } tr_p^a < 0, \sum_{k=Mtrld_p^{C+}} rq_p^k \cdot tr_p^k \geq |rq_p^a \cdot tr_p^a|\right)$$

When $tr_p^a < 0$ is satisfied, that is, a corresponding agent is an information consumer for a corresponding predicate, and a sum of the quantities of information produced by information producers within a corresponding community 100 is greater than the quantity of information consumed by the corresponding agent, the UoP is assessed as $$|rq_p^a \cdot tr_p^a| - \left(\sum_{k=Mtrld_p^{C+}} rq_p^k \cdot tr_p^k - |rq_p^a \cdot tr_p^a|\right).$$

Since the quantity of information required by the agent 10 itself ($|rq_p^a \cdot tr_p^a|$) is satisfied and further information inundation occurs $$\left(\sum_{k=Mtrld_p^{C+}} rq_p^k \cdot tr_p^k \geq |rq_p^a \cdot tr_p^a|\right),$$

the difference between the quantities of information production and information consumption $$\left(\left(\sum_{k=Mtrld_p^{C+}} rq_p^k \cdot tr_p^k - |rq_p^a \cdot tr_p^a|\right)\right)$$

is subtracted from the quantity of information required by the agent 10 ($|rq_p^a \cdot tr_p^a|$).

$$\sum_{k=Mtrld_p^{C+}} rq_p^k \cdot tr_p^k - \left(|rq_p^a \cdot tr_p^a| - \sum_{k=Mtrld_p^{C+}} rq_p^k \cdot tr_p^k\right) \quad (7d)$$

$$\left(\text{if } tr_p^a < 0, \sum_{k=Mtrld_p^{C+}} rq_p^k \cdot tr_p^k < |rq_p^a \cdot tr_p^a|\right)$$

When $tr_p^a < 0$ is satisfied, that is, a corresponding agent is an information consumer for a corresponding predicate, and the sum of the quantities of information produced by information producers within a corresponding community 100 is less than the quantity of information consumed by the corresponding agent $$\left(\sum_{k=Mtrld_p^{C+}} rq_p^k \cdot tr_p^k < |rq_p^a \cdot tr_p^a|\right),$$

the UoP is measured as $$\sum_{k=Mtrld_p^{C+}} rq_p^k \cdot tr_p^k - \left(|rq_p^a \cdot tr_p^a| - \sum_{k=Mtrld_p^{C+}} rq_p^k \cdot tr_p^k\right).$$

This is because the quantity of information production within the community 100 is less than the quantity of information consumption (that is, information starvation occurs), and thus the quantity of information starvation must be subtracted from the quantity of information production.

$$0 \text{ (if } rq_p^a \cdot tr_p^a = 0) \quad (7e)$$

When an rq·tr value is 0, the UoP is measured as 0.

In this way, a UoP value varies with community 100 organization.

FIG. 5 illustrates matrices of UoP and UoA in accordance with a preferred embodiment of the present invention.

For the matrices of RQ and TR illustrated in FIG. 3a, the calculation of Equation (7) results in matrices of FIG. 5a. The matrices illustrated in FIG. 5a are established on the basis of the best community organization derived from the calculations of the UoP, UoA and UoC, and are UoP matrices obtained by grouping agents 10 into communities 100 in the manner of co1={ag1, ag2, ag3}, co2={ag4,ag5, ag6} and co3={ag7}.

The UoP has higher and higher utility as it goes toward sign (+), and has lower and lower utility as it goes toward sign (−). The UoP means utility for individual information handled by an agent 10 within a community 100. For example, matrix UoP$^1$ represents that ag1 has a satisfaction of +16.2 for predicate 4, and has a satisfaction of −2.4 for predicate 9.

As described above, the UoP denotes only utility which a specific agent 10 has for a specific predicate. Thus, by reflecting the whole UoP collected in one agent 10, the UoA which a specific agent 10 has for all predicates is obtained.

Secondly, the UoA will be described.

The UoA, that is, utility of agent, refers to the utility which agent a belonging to community c has. This means the quantitative degree of satisfaction, which agent a has when belonging to community c. This value is obtained by adding up all UoP values, each of which corresponds to satisfaction for a specific predicate, and can be calculated by the following equation:

$$UoA_k^c = \frac{\left(\frac{\sum_{k=all\ predicate} UoP_k^{a,c}}{\sum_{k=all\ predicate} rq_k^a \cdot |tr_k^a|} \times 100 + 100\right)}{2} \quad (8)$$

Similar to the UoP, the UoA has a more and more preferred relative value as it becomes higher, and has a value of 0 to 100. In Equation (8), $UoA_a^c$ denotes utility which agent a has when belonging to community c, and significantly varies according to which community the agent belongs to. If a specific agent 10 has a UoA value of 100 within a community to which it belongs, this means that the corresponding agent 10 exactly seeks a consumer agent consuming its information and a required producer agent within a community to which it belongs.

For the UoP matrices illustrated in FIG. 5a, the calculation of Equation (8) results in matrices of FIG. 5b. The matrices illustrated in FIG. 5b are UoA matrices obtained using the UoP.

Thirdly, the UoC will be described.

The UoC refers to utility which a community 100 has. Whereas the UoA means utility or satisfaction from the standpoint of an agent 10, the UoC means utility or satisfaction from the standpoint of a community 100. That is, the UoC denotes the degree of how well production-consumption of information streams is balanced within a community 100. The fact that a UoC value is closer to 100 means that production-consumption of information within a community 100 is well balanced. This UoC value is expressed by a sum of multiplications of the UoA and a weight Awg, and can be obtained by the following equation:

$$UoC_c = \sum_{k=Mco_w} UoA_k^c \cdot Awg_k^c \quad (9)$$

As in Equation (9), $UoC_c$ is expressed by a value of agent satisfaction of community c, multiplied by an agent weight Awg. Here, the weight denotes an influence which an agent 10 exercises in a community 100. For example, when an agent 10 within a community 100 produces or consumes a lot of information, the agent 10 has a higher weight, and has a great influence on community 100 organization. The weight Awg can be obtained by the following equation:

$$Awg_a^c = \frac{\sum_{k=all\ predicate} rq_k^a \cdot |tr_k^a|}{\sum_{j=Mco_c}\sum_{k=all\ predicate} rq_k^j \cdot |tr_k^j|} \quad (10)$$

In Equation (10), $Awg_a^c$ denotes an influence which agent a exercises in community c. If a specific agent 10 produces and consumes a lot of information streams, the agent 10 has a relatively greater influence in a community 100. On the contrary, if a specific agent 10 produces or consumes few information streams, the agent 10 has a relatively smaller influence in a community 100. In order to reflect this, a function called Awg is established.

For the UoA matrices illustrated in FIG. 5b, the calculation of Equation (9) results in $UoC_1$=92.070, $UoC_2$=87.405 and $UoC_3$=0.

If the quantitative evaluation is completed in this way, the adjusting means 20 estimates community 100 organization in step ST4050.

The $UoC_c$ means utility by which it can be ascertained how efficiently community c is organized. By reflecting the UoC and a weight which a community 100 has, optimal community organization can be obtained. That is, $CO_{global}$ in which the overall UoC has the highest numerical value is determined through measured UoC numerical values, and whether or not a current community 100 organization is appropriate is determined in step ST4060 by using the determined $CO_{global}$. Therefore, the final object of the present invention, that is, efficient grouping through a quantitative evaluation of agents 10, can be ultimately achieved. The $CO_{global}$ can be obtained by the following equation:

Community Member String $w=co_1\ co_2\ co_3\ \ldots\ co_t\ \ldots\ co_T,\ co_t \in N,\ t \geq 1$ $N^+$: set of all finite length strings over N
nc: Number of Communities
Agent Member String $w=ag_1\ ag_2\ ag_3\ \ldots\ ag_t\ \ldots\ ag_T,\ ag_t \in N,\ t \geq 1$ $N^+$: set of all finite length strings over N
na: Number of Agents
The bound of the number of communities $1 \leq nc \leq na$ $$CO_{global} = \left\{ w \middle| \max\left(\sum_{k=w} UoC_w \cdot Cwg_w\right) \right\} \quad (11)$$

In Equation (11), $CO_{global}$ denotes a string set designated by w. Here, the string set is an automata string set, and means a string representing an agent set sequence in which a sum of UoC$_w$·Cwg$_w$ multiplications for all communities within a system is maximized, that is, the most optimal grouping combination. For example, in a system consisting of agent no. 1 to agent no. 8, if a universal community set CO$_{global}$ including three communities {1, 2}, {3, 4, 8} and {5, 6, 7} has the maximum sum of UoC$_w$·Cwg$_w$ multiplications, this means that the system shows the best community organization. At this time, w means constitutional strings such as {1, 2}, {3, 4, 8} and {5, 6, 7}.

In Equation (11), the weight variable Cwg refers to a weight which community w has, and is similar to the Awg in Equation (9). This is a variable for imparting a larger share to a community, which has a lot of inputs/outputs of information streams, in community determination. The weight Cwg used in Equation (11) can be obtained by the following equation:

$$Cwg^c = \frac{\sum_{j=Mco_c} \sum_{k=all\ predicate} rq_k^j \cdot |tr_k^j|}{\sum_{j=Mco_{global}} \sum_{k=all\ predicate} rq_k^j |tr_k^j|} \quad (12)$$

Software agents are expected to be utilized in all ubiquitous environments, and the present invention is expected to be utilized in agent platforms, home network systems, etc., which provide a software agent environment. In the fields including software agent services, such as home networks and public ubiquitous services, commercialization is anticipated.

As described above, according to the quantitative evaluation system and method of the present invention, the efficiency of an agent system can be maximized by quantitative evaluation based on characteristics of each agent. Also, information inundation and information starvation in a community can be minimized. In addition, efficient agent grouping can be achieved by appropriately forming communities according to matchability of interactions between agents, based on quantitative evaluation. Further, agents can be more efficiently grouped by considering individual satisfactions of agents as well as satisfactions of formed communities.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A quantitative evaluation system for multiagent grouping, comprising:
   a processor and a memory;
   a plurality of agents in a network-connected multiagent system, each of which agents has quantitative information on a predicate that is a type of information to be produced or consumed, and produces or consumes one or more types of information, wherein the quantitative information includes an RQ (Request Quality) value corresponding to quality of information on the predicate and a TR (Time Resolution) value corresponding to quantity of information created for the predicate;
   an adjusting means for receiving the quantitative information from each of the agents, performing quantitative evaluation of the received quantitative information after all of the quantitative information from the plurality of agents is received by using any one of UoP (Utility of Predicate), UoA (Utility of Agent) and UoC (Utility of Community), estimating one or more communities for the plurality of agents according to a result of the quantitative evaluation, and then grouping the plurality of agents into the one or more communities; and
   a message broker means for transferring the information gathered from the plurality of agents to the adjusting means.

2. The system of claim 1, wherein the adjusting means carries out grouping of the plurality of agents by executing calculation of the following equation:

$$CO_{global} = \left\{ w \,|\, \max\left( \sum_{k=w} UoC_w \cdot Cwg_w \right) \right\}$$

where CO$_{global}$ denotes a universal set of all the communities within the system, w denotes a string representing an agent set sequence in which a multiplication of UoC and Cwg is maximized, k denotes a constant, UoC$_w$ denotes the UoC of community w, and Cwg$_w$ denotes the weight which community w has.

3. The system of claim 2, wherein the Cwg is calculated by executing the following equation:

$$Cwg^c = \frac{\sum_{j=Mco_c} \sum_{k=all\ predicate} rq_k^j \cdot |tr_k^j|}{\sum_{j=Mco_{global}} \sum_{k=all\ predicate} rq_k^j |tr_k^j|}$$

where j denotes a variable, Mco$_c$ denotes a set of agents belonging to community c, rq$_k^j$ denotes an RQ value for the predicate of agent j, and tr$_k^j$ denotes a TR value for the predicate of agent j.

4. The system of claim 3, wherein the UoCw is calculated by executing the following equation:

$$UoC_c = \sum_{k=Mco_w} UoA_k^c \cdot Awg_k^c$$

where c denotes a variable representing an ordinal number of community c, UoA$_k^c$ denotes the UoA of agent k belonging to community c, and Awg$_k^c$ denotes an influence which agent k exercises in community c.

5. The system of claim 4, wherein the Awg$_k^c$ is calculated by executing the following equation:

$$Awg_a^c = \frac{\sum_{k=all\ predicate} rq_k^a \cdot |tr_k^a|}{\sum_{j=Mco_c} \sum_{k=all\ predicate} rq_k^j \cdot |tr_k^j|}$$

where a denotes a variable, rq$_k^a$ denotes an RQ value for the predicate of agent a, and tr$_k^a$ denotes a TR value for the predicate of agent a.

6. The system of claim 5, wherein the UoA$_k^c$ is calculated by executing the following equation:

$$UoA_k^c = \frac{\left( \frac{\sum_{k=all\ predicate} UoP_k^{a,c}}{\sum_{k=all\ predicate} rq_k^a \cdot |tr_k^a|} \times 100 + 100 \right)}{2}$$

where UoP$_k^{a,c}$ denotes the UoP which agent a belonging to community c satisfies for predicate k.

7. The system of claim 6, wherein the UoP$^{a,c}_k$ is calculated by executing the following equation:

$$UoP^{a,c}_p = \begin{cases} \left|\sum_{k=Mtrld^{c-}_p} rq^k_p \cdot tr^k_p\right| & \left(\text{if } tr^a_p > 0, \left|\sum_{k=Mtrld^{c-}_p} rq^k_p \cdot tr^k_p\right| \geq rq^a_p \cdot tr^a_p\right) \\ \left|\sum_{k=Mtrld^{c-}_p} rq^k_p \cdot tr^k_p\right| - \left(rq^a_p \cdot tr^a_p \sum_{k=Mtrld^{c-}_p} rq^a_p \cdot tr^a_p\right) & \left(\text{if } tr^a_p > 0, \left|\sum_{k=Mtrld^{c-}_p} rq^k_p \cdot tr^k_p\right| \geq rq^a_p \cdot tr^a_p\right) \\ |rq^a_p \cdot tr^a_p| - \left(\sum_{k=Mtrld^{c+}_p} rq^k_p \cdot tr^k_p - |rq^a_p \cdot tr^a_p|\right) & \left(\text{if } tr^a_p < 0, \sum_{k=Mtrld^{+}_p} rq^k_p \cdot tr^k_p \geq |rq^a_p \cdot tr^a_p|\right) \\ \sum_{k=Mtrld^{c+}_p} rq^k_p \cdot tr^k_p - \left(|rq^a_p \cdot tr^a_p| - \sum_{k=Mtrld^{c+}_p} rq^k_p \cdot tr^k_p\right) & \left(\text{if } tr^a_p < 0, \sum_{k=Mtrld^{c+}_p} rq^k_p \cdot tr^k_p < |rq^a_p \cdot tr^a_p|\right) \\ 0 & (\text{if } rq^a_p \cdot tr^a_p = 0) \end{cases}$$

where

MtrId$^{c+}_p$ denotes a set of agents belonging to community c, which have TR values with sign (+) for predicate p, and MtrId$^{c-}_p$ denotes a set of agents belonging to community c, which have TR values with sign (−) for predicate p.

8. The system of claim 7, the sign (+) meaning production, and the sign (−) means consumption.

9. A quantitative evaluation method for grouping a plurality of agents in a network-connected multiagent system, the method comprising the steps of:
 (a) gathering, by each of the agents, quantitative information on a predicate that is a type of information to be produced or consumed, wherein the quantitative information includes an RO (Request Quality) value corresponding to quality of information on the predicate and a TR (Time Resolution) value corresponding to quantity of information created for the predicate:
 (b) transmitting, by each of the agents, the gathered quantitative information to a message broker means;
 (c) transferring, by the message broker means, the quantitative information to an adjusting means;
 (d) receiving, by the adjusting means, the quantitative information;
 (e) performing, by the adjusting means, quantitative evaluation of the quantitative information after all of the quantitative information from the plurality of agents is received by using any one of UoP (Utility of Predicate), UoA (Utility of Agent) and UoC (Utility of Community);
 (f) estimating, by the adjusting means, one or more community organizations for the plurality of agents according to a result of the quantitative evaluation by the adjusting means, and then grouping the plurality of agents into the one or more community organizations;
 (g) determining, by the adjusting means, if a current community organization for one of the plurality of agents is appropriate; and
 (h) performing, by the adjusting means, maintenance or update for the current community organization of the one of the plurality of agents based on a result of the determination.

10. The method of claim 9, wherein the adjusting means carries out grouping of the plurality of agents by executing calculation of the following equation:

$$CO_{global} = \left\{w|\max\left(\sum_{k=w} UoC_w \cdot Cwg_w\right)\right\}$$

where, CO$_{global}$ denotes a universal set of all the communities within the system, w denotes a string representing an agent set sequence in which a multiplication of UoC and Cwg is maximized, k denotes a constant, UoC$_w$ denotes the UoC of community w, and Cwg$_w$ denotes the weight which community w has.

11. The method of claim 10, wherein the Cwg is calculated by executing the following equation:

$$Cwg^c = \frac{\sum_{j=Mco_c}\sum_{k=all\ predicate} rq^j_k \cdot |tr^j_k|}{\sum_{j=Mco_{global}}\sum_{k=all\ predicate} rq^j_k |tr^j_k|}$$

where j denotes a variable, Mco$_c$ denotes a set of agents belonging to community c, rq$^j_k$ denotes an RQ value for the predicate of agent j, and tr$^j_k$ denotes a TR value for the predicate of agent j.

12. The method of claim 11, wherein the UoCw is calculated by executing the following equation:

$$UoC_c = \sum_{k=Mco_w} UoA^c_k \cdot Awg^c_k$$

where c denotes a variable representing an ordinal number of community c, UoA$^c_k$ denotes the UoA of agent k belonging to community c, and Awg$^c_k$ denotes an influence which agent k exercises in community c.

13. The method of claim 12, wherein the Awg$^c_k$ is calculated by executing the following equation:

$$Awg^c_a = \frac{\sum_{k=all\ predicate} rq^a_k \cdot |tr^a_k|}{\sum_{j=Mco_c}\sum_{k=all\ predicate} rq^j_k \cdot |tr^j_k|}$$

where a denotes a variable, rq$^a_k$ denotes an RQ value for the predicate of agent a, and tr$^a_k$ denotes a TR value for the predicate of agent a.

14. The method of claim 13, wherein the UoA$^c_k$ is calculated by executing the following equation:

$$UoA^c_k = \frac{\left(\frac{\sum_{k=all\ predicate} UoP^{a,c}_k}{\sum_{k=all\ predicate} rq^a_k \cdot |tr^a_k|} \times 100 + 100\right)}{2}$$

where UoP$^{a,c}_k$ denotes the UoP that agent a belonging to community c satisfies for predicate k.

15. The method of claim 14, wherein the UoP$^{a,c}_k$ is calculated by executing the following equation:

$$UoP_p^{a,c} = \begin{cases} \left|\sum_{k=MtrId_p^{c-}} rq_p^k \cdot tr_p^k\right| & \left(\text{if } tr_p^a > 0, \left|\sum_{k=MtrId_p^{c-}} rq_p^k \cdot tr_p^k\right| \geq rq_p^a \cdot tr_p^a\right) \\ \left|\sum_{k=MtrId_p^{c-}} rq_p^k \cdot tr_p^k\right| - \left(rq_p^a \cdot tr_p^a \sum_{k=MtrId_p^{c-}} rq_p^a \cdot tr_p^a\right) & \left(\text{if } tr_p^a > 0, \left|\sum_{k=MtrId_p^{c-}} rq_p^k \cdot tr_p^k\right| \geq rq_p^a \cdot tr_p^a\right) \\ |rq_p^a \cdot tr_p^a| - \left(\sum_{k=MtrId_p^{c+}} rq_p^k \cdot tr_p^k - |rq_p^a \cdot tr_p^a|\right) & \left(\text{if } tr_p^a < 0, \sum_{k=MtrId_p^+} rq_p^k \cdot tr_p^k \geq |rq_p^a \cdot tr_p^a|\right) \\ \sum_{k=MtrId_p^{c+}} rq_p^k \cdot tr_p^k - \left(|rq_p^a \cdot tr_p^a| - \sum_{k=MtrId_p^{c+}} rq_p^k \cdot tr_p^k\right) & \left(\text{if } tr_p^a < 0, \sum_{k=MtrId_p^+} rq_p^k \cdot tr_p^k < |rq_p^a \cdot tr_p^a|\right) \\ 0 & (\text{if } rq_p^a \cdot tr_p^a = 0) \end{cases}$$

where
$MtrId_p^{c+}$ denotes a set of agents belonging to community c, which have TR values with sign (+) for predicate p, and $MtrId_p^{c-}$ denotes a set of agents belonging to community c, which have TR values with sign (−) for predicate p.

16. The method of claim 15, wherein the sign (+) means production, and the sign (−) means consumption.

* * * * *